(No Model.)
G. M. VOLTZ.
OVEN FOR VAPOR STOVES.
No. 374,219. Patented Dec. 6, 1887.
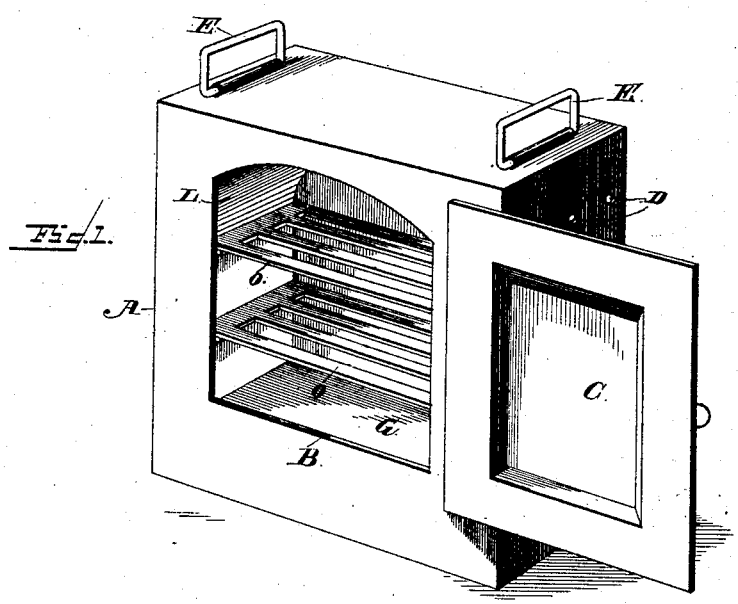
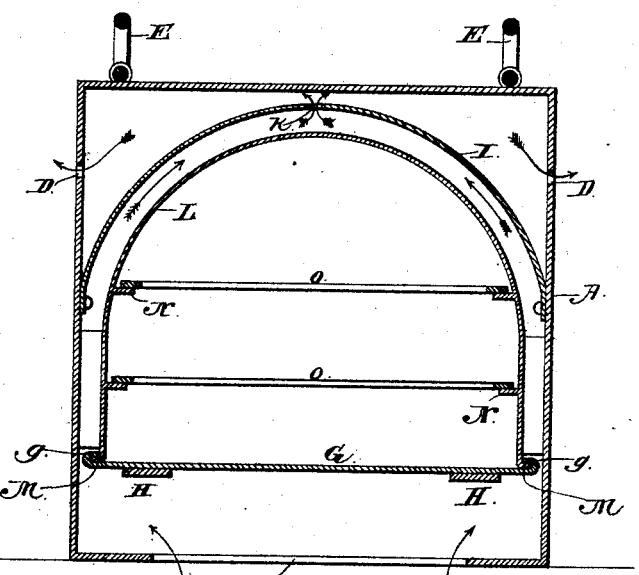
Witnesses
M. Fowler
J. W. Garner
Inventor
Geo. M. Voltz
By his Attorneys
C. A. Srowtley

UNITED STATES PATENT OFFICE.

GEORGE M. VOLTZ, OF ST. JOSEPH, MISSOURI, ASSIGNOR OF ONE-HALF TO JOHN L. KIRBY, OF SAME PLACE.

OVEN FOR VAPOR-STOVES.

SPECIFICATION forming part of Letters Patent No. 374,219, dated December 6, 1887.

Application filed December 27, 1886. Serial No. 222,663. (No model.)

*To all whom it may concern:*

Be it known that I, GEORGE M. VOLTZ, a citizen of the United States, residing at St. Joseph, in the county of Buchanan and State of Missouri, have invented a new and useful Improvement in Ovens for Vapor-Stoves, of which the following is a specification.

My invention relates to an improvement in ovens for vapor-stoves; and it consists in the peculiar construction and combination of devices, that will be more fully set forth hereinafter, and particularly pointed out in the claims.

In the drawings, Figure 1 is a perspective view of an oven embodying my improvements, with the door open. Fig. 2 is a vertical longitudinal sectional view of the same.

A represents the rectangular outer shell of the oven, one side of which is provided with an opening, B, that is closed by a hinged door, C. In the ends of the shell A, near the upper side thereof, are made outlet-openings D. On the upper side of the oven are secured handles E. In the bottom of the shell A is made a large opening, F, which registers with the holes in the vapor-stove when the oven is placed thereon.

G represents a bottom plate, which is supported upon horizontal cross-bars H, that extend from side to side of the shell A, at a suitable distance from the lower side thereof. The bottom plate, G, is made of sheet metal, and its ends are bent to form flanges $g$. The length of the bottom-plate, G, is such that a space is left between each end of the bottom-plate and the ends of the shell A. In the upper side of the shell is located a semicircular deflecting-plate, I. The lower sides of the said plate come in contact with the end walls of the shell A; but the upper side of the plate is at some distance from the top of the said shell, and in the center of the plate I, at its highest point, are made a series of openings, K, that communicate with the space between the upper portion of the shell A and the curved deflecting-plate.

L represents the lining of the oven, which is made of a single piece of sheet metal, having its lower ends bent outwardly at right angles to form flanges M, which are adapted to fit under the flanges $g$ of the bottom plate, so as to secure the said lining thereto.

In order to insert the lining in the oven, it is bent to form a scroll or circle, and is introduced into the oven through the doorway B. The lower ends of the lining are then forced outwardly, so as to cause their flanges M to lock under the flanges $g$ of the bottom plate. The length of the sheet of metal of which the lining is made is such that when the lining is located in the oven it is out of contact with the end walls and with the deflecting-plate thereof, and the upper side of the lining is curved concentrically with the deflecting-plate. This provides an uninterrupted flue, which extends entirely around the lining of the oven, between the same and the end walls and the deflecting-plate.

N represents ledges which project from the inner sides of the lining and serve to support the usual grates, O, on which the articles are placed for baking.

From the foregoing description it will be understood that the lining may be very readily removed from the oven and replaced by a new one when it becomes burned or tarnished, and that the upper side of the oven is curved. This peculiar shape of the oven is very advantageous, for the reason that it causes the heat to be deflected into the oven, so as to heat the interior thereof to a very high degree and at an equal temperature at all parts.

The operation of my invention will be very readily understood. The heat and products of combustion pass upwardly between the lining of the oven and the end walls thereof and strike against the curved deflecting-plate and escape through the openings therein into the space or chamber above the deflecting-plate. The heat is then caused to move outwardly toward the end walls of the oven and downwardly over the deflecting-plate, in order to reach the openings D, through which it escapes, and thus the deflecting-plate is heated by contact with the heated air on both sides. The curved upper side of the lining and the curved lower side of the deflecting-plate interpose no obstruction to the passage of the heated air over the lining.

In an oven thus constructed an intense heat may be readily maintained at an even temperature, and bread, cakes, or pies may be baked as readily upon one of the grates as on the other, as there is no necessity for changing the location of the articles that are being baked in the oven in order to enable them to be browned upon both sides.

Having thus described my invention, I claim—

1. A portable oven having the outer shell, a fixed bottom plate inclosed therein, the cross-bars H, supporting the bottom plate, a curved deflecting-plate, I, affixed at its ends to the side walls of the shell and arranged out of contact with the roof of the shell, to thereby leave an intermediate space, the said deflecting-plate having an outlet-opening, K, and the removable imperforate lining formed of sheet metal and detachably connected at its lower sides to the bottom-plate, to be held in place thereby, the upper side of the lining being curved concentric with the deflecting-plate and arranged a short distance therefrom, to form an intermediate flue, which extends around the vertical sides of the lining, and the outlet-openings D, formed in the shell above the deflecting-plate and communicating with the space above the latter, as and for the purpose described.

2. In an oven for vapor-stoves, the combination of the outer shell, A, having the openings D near its upper side, the inner shell secured in the outer shell and out of contact therewith, thereby leaving continuous flues or spaces below, above, and on the sides of the inner shell and entirely surrounding the same, the upper side of the said inner shell being curved, and the curved deflecting-plate I, secured to the sides of the outer shell and arranged above the inner shell and out of contact therewith, said deflecting-plate having the opening K, all combined and arranged to operate substantially as described.

3. In an oven for vapor-stoves, the combination of the outer shell, A, having the openings D near its upper side and the opening F in its bottom, the cross-bars H, extending across the shell A, above the bottom thereof, the curved deflecting-plate I, secured in the upper side of the outer shell, below the top thereof, and having the opening K, and the inner shell comprising the bottom plate, G, supported on the bars H, and having the grooves $g$ in its ends, and the curved flexible plate L, having the flanges M at its lower ends, engaging the grooves $g$, the said plate L being further provided with the flanges N, to support the grates, the inner shell being arranged out of contact with the outer shell and below and out of contact with the deflecting-plate, substantially as described.

4. In an oven, the detachable lining L, made of sheet metal, substantially in the form of the letter U, combined with the bottom plate, G, having grooves $g$, the said lining having a spring action and provided with flanges $m$ to engage the grooves $g$, as set forth.

In testimony that I claim the foregoing as my own I have hereto affixed my signature in presence of two witnesses.

GEORGE M. VOLTZ.

Witnesses:
JOHN H. THORPE,
JOHN W. ASHWORTH.